(12) United States Patent
Sannomiya et al.

(10) Patent No.: US 12,447,779 B2
(45) Date of Patent: Oct. 21, 2025

(54) TIRE INTERNAL PRESSURE MANAGEMENT DEVICE, TIRE INTERNAL PRESSURE MANAGEMENT PROGRAM, AND TIRE INTERNAL PRESSURE MANAGEMENT METHOD

(71) Applicant: BRIDGESTONE CORPORATION, Tokyo (JP)

(72) Inventors: Takenori Sannomiya, Tokyo (JP); Kazutaka Matsuzawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 27 days.

(21) Appl. No.: 18/563,809

(22) PCT Filed: Aug. 16, 2022

(86) PCT No.: PCT/JP2022/030983
§ 371 (c)(1),
(2) Date: Nov. 22, 2023

(87) PCT Pub. No.: WO2023/026900
PCT Pub. Date: Mar. 2, 2023

(65) Prior Publication Data
US 2024/0262138 A1 Aug. 8, 2024

(30) Foreign Application Priority Data
Aug. 23, 2021 (JP) .................................. 2021-135652

(51) Int. Cl.
*B60C 23/04* (2006.01)
(52) U.S. Cl.
CPC ...... *B60C 23/0442* (2013.01); *B60C 23/0457* (2013.01); *B60C 23/0476* (2013.01)

(58) Field of Classification Search
CPC ........... B60C 23/0442; B60C 23/0457; B60C 23/0476; B60C 2200/02; B60C 23/0474
(Continued)

(56) References Cited

U.S. PATENT DOCUMENTS 5,895,846 A * 4/1999 Chamussy .......... B60C 23/0474
73/146.2
8,823,505 B2 * 9/2014 Maekawa ........... B60C 23/0408
73/146.2
(Continued)

FOREIGN PATENT DOCUMENTS

DE 101 44 328 B4 10/2015
EP 4 306 337 A1 1/2024
(Continued)

OTHER PUBLICATIONS

Extended European Search Report dated Oct. 31, 2024 in Application No. 22861188.5.
(Continued)

*Primary Examiner* — Eric Blount
(74) *Attorney, Agent, or Firm* — Sughrue Mion, PLLC

(57) ABSTRACT

A tire internal pressure management device includes a data acquisition unit that acquires internal pressure time series data and temperature time series data of each tire mounted on a mobile body including an aircraft and a vehicle, a representative value calculation unit that calculates a representative value of internal pressure data subjected to temperature correction for each predetermined period, based on the acquired internal pressure time series data and temperature time series data, and an internal pressure filling timing prediction unit that predicts a timing when an internal pressure value falls below a threshold value that is set in
(Continued)

advance as an internal pressure filling timing, based on a transition of the calculated representative value of the internal pressure data.

10 Claims, 4 Drawing Sheets

(58) Field of Classification Search
USPC .................................................. 340/447, 445
See application file for complete search history.

(56) References Cited

U.S. PATENT DOCUMENTS

| | | | |
|---|---|---|---|
| 11,090,986 B1* | 8/2021 | Lerner | .................... G01L 17/00 |
| 11,407,259 B2* | 8/2022 | Bill | ..................... B60C 23/0476 |
| 2003/0070477 A1 | 4/2003 | Fischer et al. | |
| 2004/0017289 A1 | 1/2004 | Brown, Jr. | |
| 2007/0171038 A1 | 7/2007 | Maekawa | |
| 2015/0134197 A1* | 5/2015 | Cahill | ................. B60C 23/0486 |
| | | | 701/33.7 |
| 2017/0305213 A1 | 10/2017 | Taki | |
| 2019/0023089 A1* | 1/2019 | Abdossalami | .......... G01M 3/26 |
| 2021/0107323 A1* | 4/2021 | Bill | ..................... B60C 23/0474 |

FOREIGN PATENT DOCUMENTS

| | | |
|---|---|---|
| JP | 2004-058998 A | 2/2004 |
| JP | 2006-327554 A | 12/2006 |
| JP | 2007-196834 A | 8/2007 |
| JP | 2017-194412 A | 10/2017 |
| JP | 2019-014401 A | 1/2019 |

OTHER PUBLICATIONS

International Search Report of PCT/JP2022/030983 dated Nov. 1, 2022 [PCT/ISA/210].

* cited by examiner

TIRE INTERNAL PRESSURE MANAGEMENT DEVICE, TIRE INTERNAL PRESSURE MANAGEMENT PROGRAM, AND TIRE INTERNAL PRESSURE MANAGEMENT METHOD

CROSS REFERENCE TO RELATED APPLICATIONS

This application is a National Stage of International Application No. PCT/JP2022/030983 filed on Aug. 16, 2022, claiming priority based on Japanese Patent Application No. 2021-135652 filed on Aug. 23, 2021.

TECHNICAL FIELD

The present embodiment relates to a tire internal pressure management device, a tire internal pressure management program, and a tire internal pressure management method which are applicable to tires of a mobile body including an aircraft and a vehicle.

BACKGROUND ART

An internal pressure of tires for an aircraft, which is a type of a mobile body, is checked when the tires are mounted on an aircraft or before takeoff, and is adjusted so as to become the internal pressure that takes into account the load during takeoff and landing.

For tires for an aircraft or the like, it is necessary to accurately grasp an internal pressure and fill the internal pressure as necessary from the viewpoint of ensuring the safety of an aircraft or the like.

Accordingly, various technologies have been proposed for tire internal pressure management devices that acquire and manage the internal pressure of tires for an aircraft (Patent Literature 1).

This ensures the safety of an aircraft and prevents the failure of tires by controlling the internal pressure of the tires and grasping an appropriate timing for filling the internal pressure or the like.

CITATION LIST

Patent Literature

Patent Literature 1: JP2004-58998A

SUMMARY OF THE INVENTION

Technical Problem

Here, when the tire management device provides information on the timing for filling the internal pressure of tires, it is necessary to perform appropriate temperature correction because the internal pressure changes due to the temperature change in the tires.

However, when the temperature of the tires changes greatly due to the takeoff and landing of an aircraft or the like, it is inconvenient that it is difficult to accurately grasp the internal temperature of the tires. For this reason, there has been a problem that proper temperature correction cannot be performed and thus that the timing for filling the tire internal pressure cannot be accurately predicted.

Therefore, the present invention has been made in view of the above problem, and an object of the present invention is to provide a tire internal pressure management device, a tire internal pressure management program, and a tire internal pressure management method capable of predicting an appropriate internal pressure filling timing of tires of a mobile body including an aircraft and a vehicle even when the temperature of the tires changes greatly.

Technical Solution

A tire internal pressure management device according to an aspect of the present invention includes: a data acquisition unit that acquires internal pressure time series data and temperature time series data of each tire mounted on a mobile body including an aircraft and a vehicle; a representative value calculation unit that calculates a representative value of internal pressure data subjected to temperature correction for each predetermined period, based on the acquired internal pressure time series data and temperature time series data; and an internal pressure filling timing prediction unit that predicts a timing when an internal pressure value falls below a threshold value that is set in advance as an internal pressure filling timing, based on a transition of the calculated representative value of the internal pressure data.

This makes it possible to predict an appropriate internal pressure filling timing even when the temperature of tires changes greatly.

Further, the tire internal pressure management device may include a tire number prediction unit that predicts the number of tires for which a tire internal pressure needs to be filled in a future predetermined period, based on a calculation result of the internal pressure filling timing of each tire.

This makes it possible to predict the man-hour required in the internal pressure filling operation, thereby improving the efficiency of the operation.

Further, the tire internal pressure management device may include an internal pressure filling timing correction unit that corrects the internal pressure filling timing of each tire mounted on the same moving body such that the internal pressure filling timing becomes the same timing when the internal pressure filling timing is within a predetermined period that is set in advance.

This makes it possible to collectively perform the internal pressure filling operation for a plurality of tires whose internal pressure filling timing is relatively close to each other, thereby further improving the efficiency of the operation.

Further, the tire internal pressure management device may include an abnormality determination unit that calculates an internal pressure lowering speed based on a transition of the representative value of the internal pressure data, and determines to be abnormal when exceeding a threshold value of the internal pressure lowering speed that is set in advance.

This makes it possible to quickly detect the abnormality of tires, thereby contributing to improving the safety of a mobile body including an aircraft and a vehicle.

Further, a tire internal pressure management program according to another aspect of the present invention includes: a data acquisition step of acquiring internal pressure time series data and temperature time series data of each tire mounted on a mobile body including an aircraft and a vehicle; a representative value calculation step of calculating a representative value of internal pressure data subjected to temperature correction for each predetermined period, based on the acquired internal pressure time series data and temperature time series data; and an internal pressure filling timing prediction step of predicting a timing when an internal pressure value falls below a threshold value that is set in advance as an internal pressure filling timing, based on a transition of the calculated representative value of the internal pressure data, in which the tire internal pressure management program is executed in a tire internal pressure management device.

This makes it possible to predict an appropriate internal pressure filling timing even when the temperature of tires changes greatly.

Further, a tire internal pressure management method according to another aspect of the present invention includes: a data acquisition process of acquiring internal pressure time series data and temperature time series data of each tire mounted on a mobile body including an aircraft and a vehicle; a representative value calculation process of calculating a representative value of internal pressure data subjected to temperature correction for each predetermined period, based on the acquired internal pressure time series data and temperature time series data; and an internal pressure filling timing prediction process of predicting a timing when an internal pressure value falls below a threshold value that is set in advance as an internal pressure filling timing, based on a transition of the calculated representative value of the internal pressure data.

This makes it possible to predict an appropriate internal pressure filling timing even when the temperature of tires changes greatly.

The present invention makes it possible to provide a tire internal pressure management device, a tire internal pressure management program, and a tire internal pressure management method capable of predicting an appropriate internal pressure filling timing of tires of a mobile body including an aircraft and a vehicle even when the temperature of the tires changes greatly.

DESCRIPTION OF EMBODIMENTS

Figure 1:
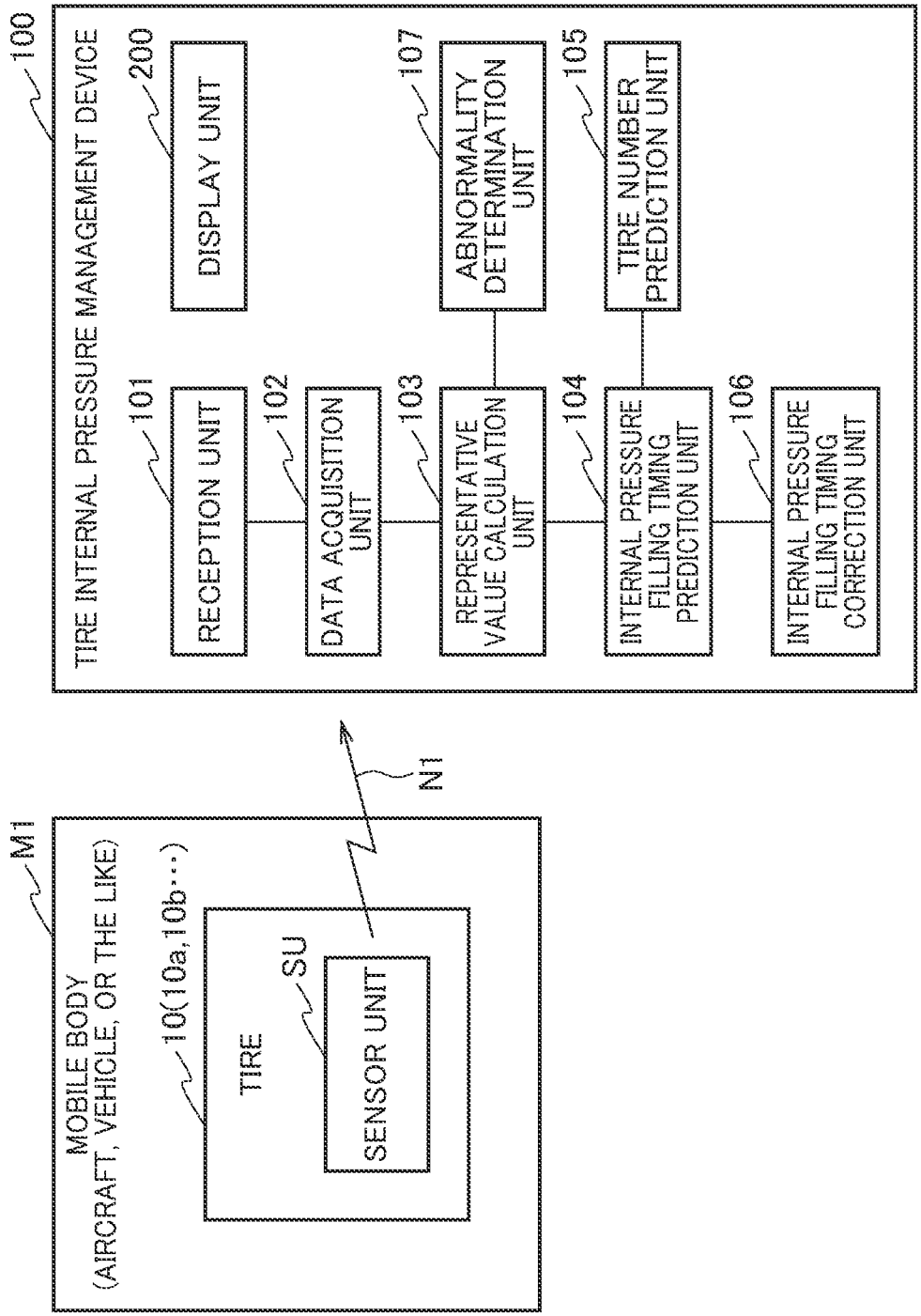
FIG. 1 is a functional block diagram illustrating a functional configuration of a tire pressure management device according to an embodiment.

A tire internal pressure management device 100 according to an embodiment of the present invention will be described with reference to FIGS. 1 to 4.

Note that the same or similar portions are denoted by the same or similar reference numerals in the following descriptions of the drawings. It should be noted however that the drawings are schematic and ratios of dimensions and the like are different from the actual ones.

Accordingly, specific dimensions and the like should be determined in consideration of the following descriptions. Moreover, the drawings include parts showing dimensional relations and ratios that are different from each other, as a matter of course.

(Schematic Configuration of Tire Internal Pressure Management Device)

A schematic configuration of a tire internal pressure management device 100 according to an embodiment will be described with reference to a functional block diagram of FIG. 1 and a schematic configuration diagram of FIG. 2.

The tire internal pressure management device 100 is configured of, for example, a general-purpose computer, a server, and the like, and as illustrated in FIG. 1, is configured to receive internal pressure data and temperature data from a sensor unit SU provided in each tire 10 (10a, 10b . . . ) mounted on a mobile body M1 including an aircraft or a vehicle via a wireless line N1.

Figure 2:
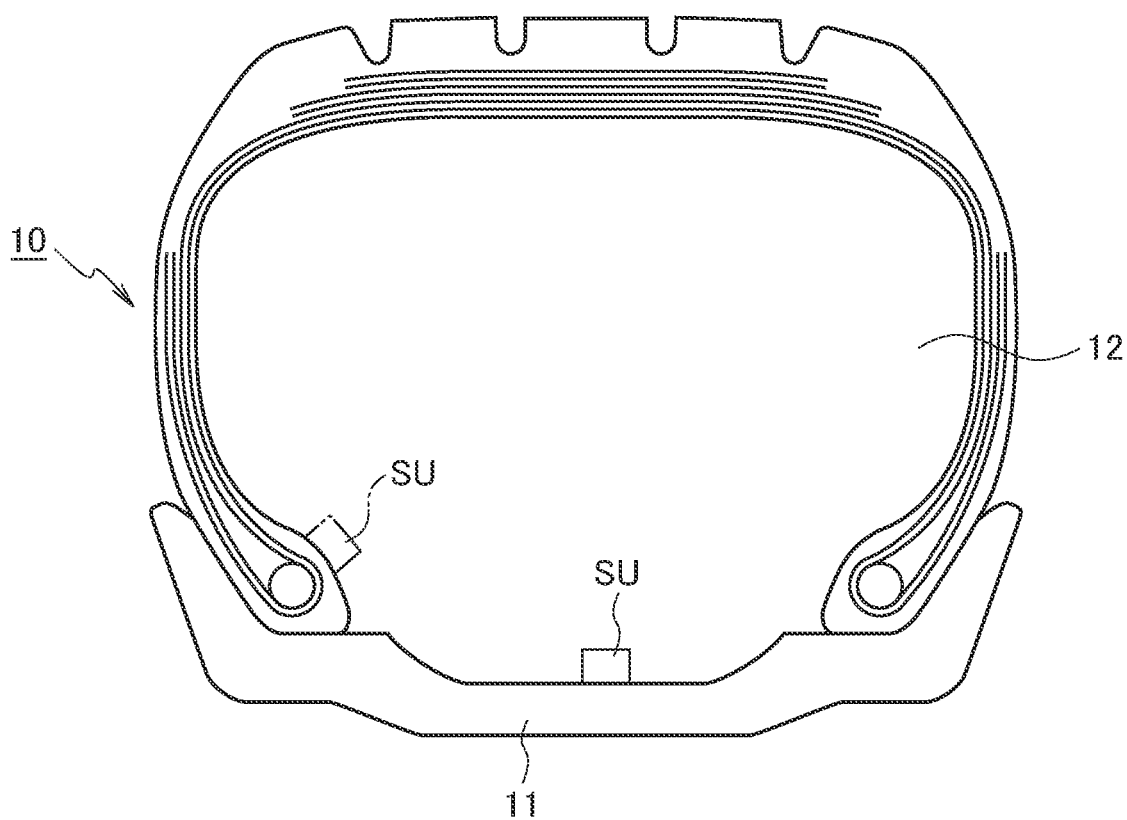
FIG. 2 is a schematic configuration diagram illustrating a partial configuration example of the tire pressure management device according to the embodiment.

As illustrated in FIG. 2, the tire 10 is mounted on a wheel 11 to form a tire air chamber 12.

The sensor unit SU is provided inside the wheel 11 or on the inner wall of the tire 10. It is needless to say that, for example, an aircraft tire is used in an aircraft and a vehicle tire is used in a vehicle, depending on the type of the mobile body M1.

As illustrated in FIG. 1, the tire internal pressure management device 100 includes a reception unit 101 that receives internal pressure data and temperature data from the sensor unit SU having a transmission function via the wireless line N1.

The tire internal pressure management device 100 includes a data acquisition unit 102 that acquires internal pressure time series data and temperature time series data, based on the received internal pressure data and temperature data.

In addition, the tire internal pressure management device 100 includes a representative value calculation unit 103 that calculates a representative value of the internal pressure data subjected to temperature correction for each predetermined period (for example, 24 hours), based on the acquired internal pressure time series data and temperature time series data. For example, in a case where the mobile body M1 is an aircraft, the temperature can be corrected based on a simulation result of the internal pressure from immediately after landing when the tire 10 becomes high heat (for example, about 70 to 80 degrees) until becoming the outside air temperature.

In addition, the tire internal pressure management device 100 includes an internal pressure filling timing prediction unit 104 that predicts a timing when the internal pressure value falls below a threshold value that is set in advance as an internal pressure filling timing, based on a transition of the calculated representative value of the internal pressure data.

This makes it possible to predict an appropriate internal pressure filling timing even the temperature of the tires changes greatly, as in the case where the moving body M1 is an aircraft, thereby contributing to improving the safety of an aircraft or the like.

Further, the tire internal pressure management device 100 includes a tire number prediction unit 105 that predicts the number of tires for which a tire internal pressure needs to be filled in a future predetermined period (for example, from one day to about one week), based on the calculation result of the internal pressure filling timing of each tire 10 (10a, 10b . . . ).

This makes it possible to predict the man-hour required in the internal pressure filling operation, thereby improving the efficiency of the operation. In particular, when the mobile body M1 is an aircraft, the internal pressure filling operation needs to be performed in a short period between the arrival and departure, and the operation can be performed efficiently by grasping the prediction result of the number of tires for which a tire internal pressure needs to be filled (for example, the operation only needs to be performed on three tire among six tires).

In addition to the number of tires for which a tire internal pressure needs to be filled, it is also possible to specify that the internal pressure filling operation is required for which tires 10a, 10b . . . (for example, specify one front wheel and two rear wheels), and in this case, the operation can be performed more efficiently.

In addition, the tire internal pressure management device 100 includes an internal pressure filling timing correction unit 106 that corrects an internal pressure filling timing of each tire 10 (10a, 10b . . . ) mounted on the same moving body M1 such that the internal pressure filling timing becomes the same timing when the internal pressure filling timing is within a predetermined period that is set in advance (for example, from one day to about one week).

This makes it possible to collectively perform the internal pressure filling operation for a plurality of tires 10a and 10b . . . whose internal pressure filling timing is relatively close to each other, thereby further improving the efficiency of the operation.

In addition, the tire internal pressure management device 100 includes an abnormality determination unit 107 that calculates an internal pressure lowering speed based on the transition of the representative value of the internal pressure data, and determines to be abnormal when exceeding a threshold value of the internal pressure lowering speed that is set in advance.

This makes it possible to quickly detect the abnormality of the tire 10 (10a, 10b . . . ), thereby contributing to improving the safety of the mobile body M1 including an aircraft and a vehicle.

When it is determined to be abnormal, the manager or the like can be notified by displaying an alert on a display unit 200 constituted of a liquid crystal display device or the like, or producing a voice message.

(Mode of Data Acquisition)

A mode in which internal pressure data and temperature data of the tire 10 are acquired will be briefly described with reference to FIGS. 2 and 3.

In the mode illustrated in FIG. 2, the sensor unit SU having a transmission function is provided inside the wheel 11 on which the tire 10 is mounted, or on the inner wall of the tire 10.

This makes it possible to acquire the internal pressure data and the temperature data acquired by the sensor unit SU via the reception unit 101 of the tire internal pressure management device 100, or a dedicated reading device.

Figure 3:
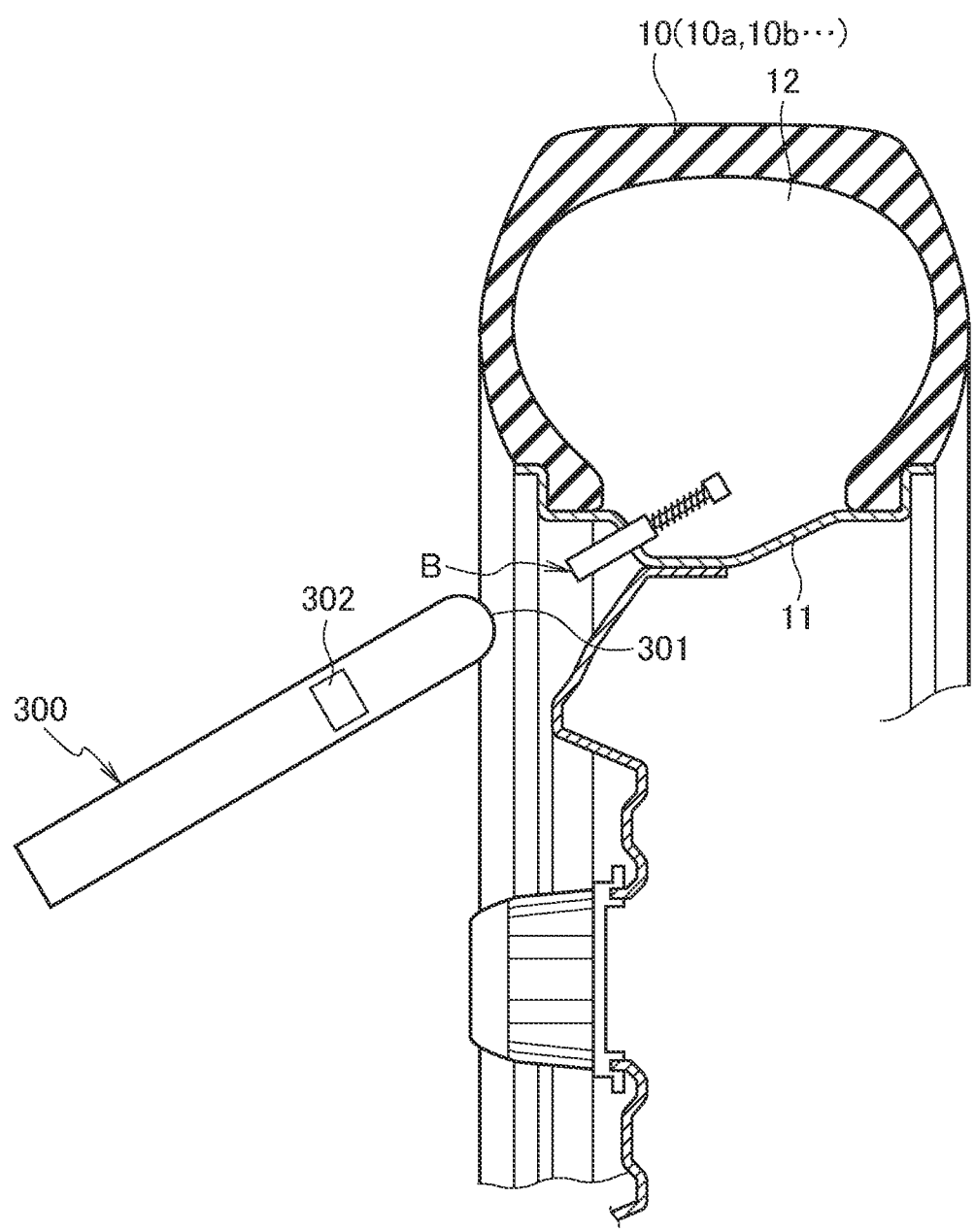
FIG. 3 is a schematic configuration diagram illustrating another partial configuration example of the tire pressure management device according to the embodiment.

In the mode illustrated in FIG. 3, a valve B having a sensor is provided on the wheel 11 on which the tire 10 is mounted, and a dedicated reading device 300 is brought close to the valve B, thereby acquiring the internal pressure data and temperature data.

The dedicated reading device 300 includes, for example, a data reception unit 301 at the tip end thereof, and is configured to display and check the values of the acquired internal pressure data and temperature data on a display unit 302 constituted of a liquid crystal display or the like. Further, the dedicated reading device 300 has a transmission function, and the tire internal pressure management device 100 can receive and acquire the internal pressure data and the temperature data at the reception unit 101.

(Tire Internal Pressure Management Processing)

Figure 4:
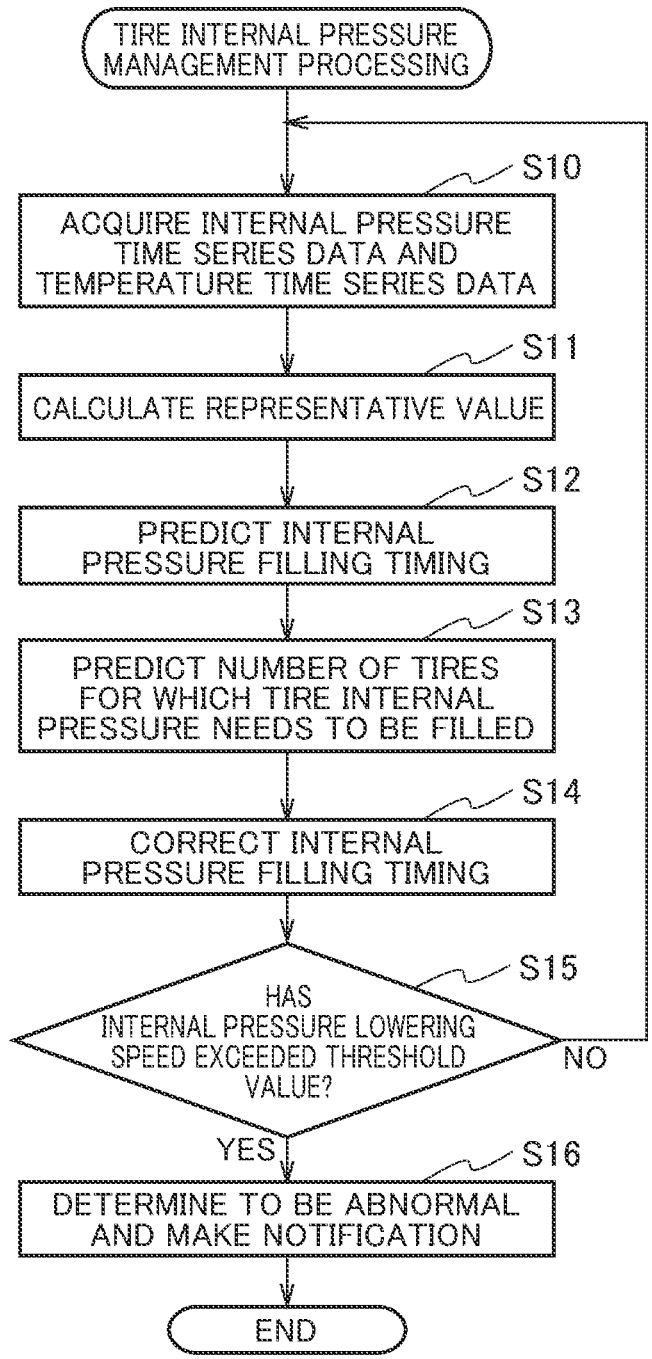
FIG. 4 is a flowchart illustrating an example of a processing procedure of tire pressure management processing executed by the tire pressure management device according to the embodiment.

A description will be given regarding an example of a processing procedure of tire internal pressure management processing executed by the tire internal pressure management device 100 will be described with reference to the flowchart of FIG. 4.

When the processing has started, the internal pressure time series data and temperature time series data are first acquired in step S10, and the processing proceeds to step S11.

In step S11, a representative value of the internal pressure data subjected to temperature correction for each predetermined period is calculated, based on the acquired internal pressure time series data and temperature time series data, and the processing proceeds to step S12.

In step S12, the timing when an internal pressure value falls below the predetermined threshold value is predicted as the internal pressure filling timing, based on the transition of the calculated representative value of the internal pressure data, and the processing proceeds to step S13.

In step S13, the number of tires for which a tire internal pressure needs to be filled in the future predetermined period is predicted based on the calculation result of the internal pressure filling timing of each tire 10a, 10b . . . , and the processing proceeds to step S14.

In step S14, when the internal pressure filling timing of each tire 10a, 10b . . . mounted on the same mobile body M1 is within a predetermined period, the internal pressure filling timing is corrected so as to become the same timing, and the processing proceeds to step S15.

In step S15, the internal pressure lowering speed is calculated based on the transition of the representative value of the internal pressure data, and it is determined whether or not the internal pressure lowering speed has exceeded a threshold value of the internal pressure lowering speed that is set in advance.

If the determination result is "No", the processing returns to step S10, and if it is "Yes", the processing moves to step S16.

In step S16, it is determined to be abnormal, and the processing will end with notification by display of a message, or notification by voice output.

Note that the processing results in steps S11 to S14 may be output and displayed on the display unit 200.

This makes it possible to predict an appropriate internal pressure filling timing or the like even when the temperature of tires changes greatly, for example, in a case where the moving body M1 is an aircraft, thereby contributing to improving the safety and efficiency of an operation.

The tire internal pressure management device, the tire state amount estimation program, and the tire state amount estimation method of the present invention have been described based on the illustrated embodiment; however, the present invention is not limited thereto, and the configuration of each component may possibly be replaced by any other configurations having equivalent functions.

For example, the internal pressure filling timing prediction unit 104 may reset an internal pressure filling timing, based on information on tire replacement and internal pressure filling.

The tire internal pressure management device 100 may be configured to include a notification unit that transmits to a predetermined notification destination, an internal pressure filling timing calculated by the internal pressure filling timing prediction unit 104 and the predicted number of tires calculated by the tire number prediction unit 105.

In addition, when the notification unit is provided, an internal pressure filling target value set for each tire may be transmitted.

In addition, the predetermined period for acquiring minimum internal pressure data may not be constant.

In addition, acquired when the mobile body M1 is an aircraft, the acquired internal pressure data may be corrected based on the elapsed time from the time of landing to the time in which the internal pressure data is.

The internal pressure filling timing prediction unit 104 may change an internal pressure filling timing (for example, change a threshold value) according to a predicted air temperature (for example, based on weather forecasts). That is, when predicting a tire internal pressure, air temperature becomes an important factor, and in particular, whether or not the tire internal pressure actually falls below a specified internal pressure is often affected by the air temperature of the day.

In addition, the tire internal pressure management device 100 may further calculate and report a temperature at which the internal pressure filling is required in the calculated internal pressure filling timing, or the temperature information.

That is, for example, information such as "after . . . days, if the temperature is . . . ° C., the tires need to be filled" can be displayed on the display unit 200, or notified by producing voice, thereby improving the safety and convenience of the tire internal pressure management device 100.

LIST OF REFERENCE NUMERALS

M1: Mobile body (aircraft, vehicle, or the like)
100: Tire internal pressure management device
10 (10*a*, 10*b* . . . ): Tire
SU: Sensor unit
101: Reception unit
102: Data acquisition unit
103: Representative value calculation unit
104: Internal pressure filling timing prediction unit
105: Tire number prediction unit
106: Internal pressure filling timing correction unit
107: Abnormality determination unit
200: Display unit

The invention claimed is:

1. A tire internal pressure management device comprising:
a data acquisition unit that acquires internal pressure time series data and temperature time series data of each tire mounted on a mobile body including an aircraft;
a representative value calculation unit that calculates a representative value of internal pressure data subjected to temperature correction for each predetermined period including a period from immediately after landing of the aircraft until a temperature of each tire becomes an outside air temperature, based on the acquired internal pressure time series data and temperature time series data; and
an internal pressure filling timing prediction unit that predicts a timing when an internal pressure value falls below a threshold value that is set in advance as an internal pressure filling timing, based on a transition of the calculated representative value of the internal pressure data.

2. The tire internal pressure management device according to claim 1, further comprising:
a tire number prediction unit that predicts the number of tires for which a tire internal pressure needs to be filled in a future predetermined period between arrival and departure of the aircraft, based on a calculation result of the internal pressure filling timing of each tire.

3. The tire internal pressure management device according to claim 1, further comprising:
an internal pressure filling timing correction unit that corrects the internal pressure filling timing of each tire mounted on the same aircraft such that the internal pressure filling timing becomes a same timing when the internal pressure filling timing is within a predetermined period that is set in advance.

4. The tire internal pressure management device according to claim 1, further comprising:
an abnormality determination unit that calculates an internal pressure lowering speed based on a transition of the representative value of the internal pressure data, and determines to be abnormal when exceeding a threshold value of the internal pressure lowering speed that is set in advance.

5. A non-transitory computer readable recording medium storing a tire internal pressure management program comprising:
a data acquisition step of acquiring internal pressure time series data and temperature time series data of each tire mounted on a mobile body including an aircraft;
a representative value calculation step of calculating a representative value of internal pressure data subjected to temperature correction for each predetermined period including a period from immediately after landing of the aircraft until a temperature of each tire becomes an outside air temperature, based on the acquired internal pressure time series data and temperature time series data; and
an internal pressure filling timing prediction step of predicting a timing when an internal pressure value falls below a threshold value that is set in advance as an internal pressure filling timing, based on a transition of the calculated representative value of the internal pressure data, wherein
the tire internal pressure management program is executed in a tire internal pressure management device.

6. A tire internal pressure management method comprising:
a data acquisition process of acquiring internal pressure time series data and temperature time series data of each tire mounted on a mobile body including an aircraft;
a representative value calculation process of calculating a representative value of internal pressure data subjected to temperature correction for each predetermined period including a period from immediately after landing of the aircraft until a temperature of each tire becomes an outside air temperature, based on the acquired internal pressure time series data and temperature time series data; and
an internal pressure filling timing prediction process of predicting a timing when an internal pressure value falls below a threshold value that is set in advance as an internal pressure filling timing, based on a transition of the calculated representative value of the internal pressure data.

7. The tire internal pressure management device according to claim 2, further comprising:
an internal pressure filling timing correction unit that corrects the internal pressure filling timing of each tire mounted on the same aircraft such that the internal pressure filling timing becomes a same timing when the internal pressure filling timing is within a predetermined period that is set in advance.

8. The tire internal pressure management device according to claim 2, further comprising:
   an abnormality determination unit that calculates an internal pressure lowering speed based on a transition of the representative value of the internal pressure data, and determines to be abnormal when exceeding a threshold value of the internal pressure lowering speed that is set in advance.

9. The tire internal pressure management device according to claim 3, further comprising:
   an abnormality determination unit that calculates an internal pressure lowering speed based on a transition of the representative value of the internal pressure data, and determines to be abnormal when exceeding a threshold value of the internal pressure lowering speed that is set in advance.

10. The tire internal pressure management device according to claim 1, wherein the internal pressure filling timing prediction unit is configured to change the internal pressure filling timing according to a predicted air temperature and predict a temperature of the tire or information of air temperature at which the internal pressure filling of the tire is required.

* * * * *